W. E. HAWKINS.
Covered Dish.

No. 165,926.  Patented July 27, 1875.

Witnesses.
N. Shumway.
Clara Broughton.

Westel E. Hawkins
Inventor.
By Atty.

UNITED STATES PATENT OFFICE.

WESTEL E. HAWKINS, OF WALLINGFORD, CONNECTICUT, ASSIGNOR TO SIMPSON, HALL, MILLER & CO., OF SAME PLACE.

IMPROVEMENT IN COVERED DISHES.

Specification forming part of Letters Patent No. 165,926, dated July 27, 1875; application filed May 11, 1875.

*To all whom it may concern:*

Be it known that I, WESTEL E. HAWKINS, of Wallingford, in the county of New Haven and State of Connecticut, have invented a new Covered Dish; and I do hereby declare the following, when taken in connection with the accompanying drawings and the letters of reference marked thereon, to be a full, clear, and exact description of the same, and which said drawings constitute part of this specification, and represent in—

Figure 1:
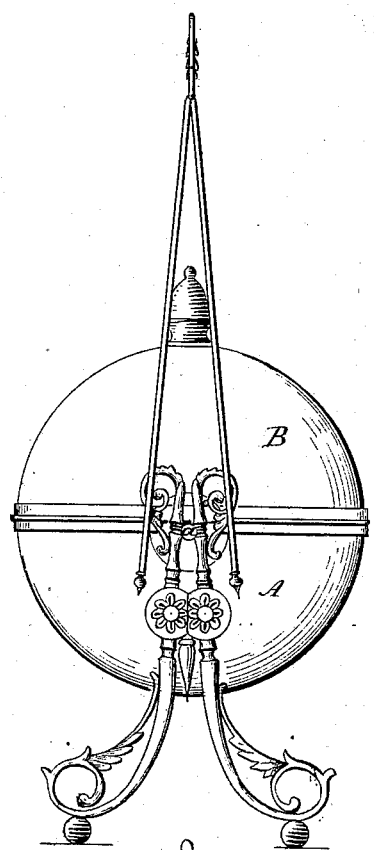
Figure 2:
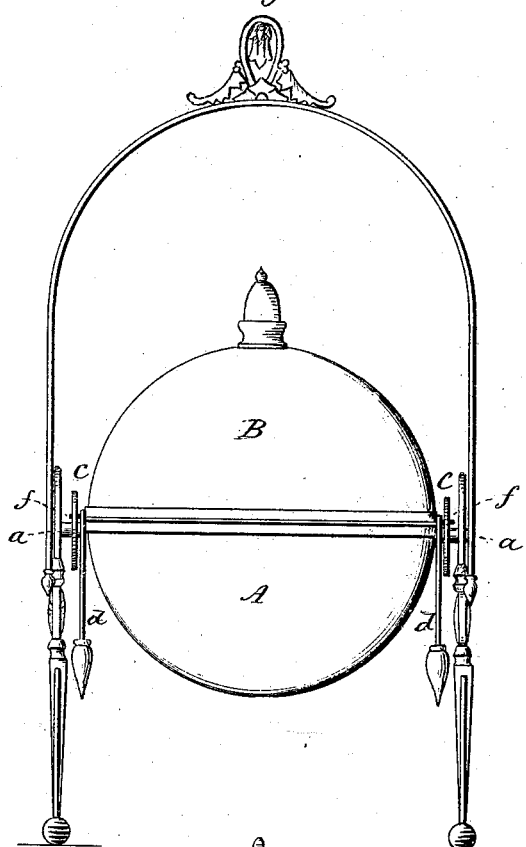
Figure 3:
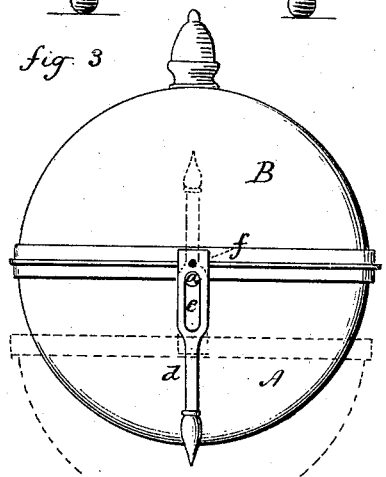
Figure 4:
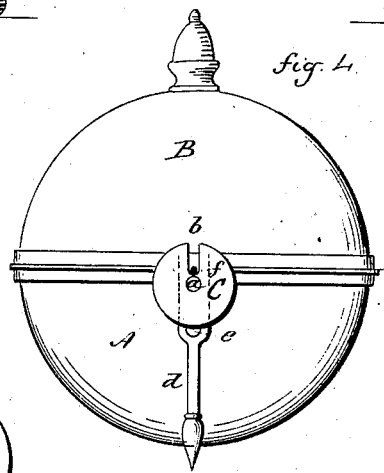
Figure 5:
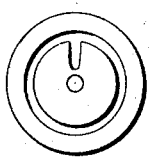

Figure 1, side view; Fig. 2, front view; Figs. 3 and 4, detached views; Fig. 5, a modification.

This invention relates to an improvement in dishes for table use, which are provided with removable covers, with special reference to butter-dishes, although applicable to other covered ware, the object being to remove the cover without entire separation from the dish.

The invention consists in providing the cover with a downward-projecting arm upon opposite sides, with a substantially vertical slot, through which a trunnion or stud on the dish extends, so that the said slot will prevent the entire separation of the cover from the dish, but allow the cover to be raised from the dish, and turned over to fall beneath the dish, and be there suspended by means of the slot in the said arms hanging upon the said studs; and, secondly, in combining, with such a construction, a cam which shall guide the cover in its swinging movement, and substantially lock it in position when closed.

A is the dish proper, and B the cover, here represented as each of semi-spherical form. The dish is hung in a suitable frame by studs or trunnions $a$, upon opposite sides, so as to leave a space between the dish and the frame.

On each side of the cover is an arm, $d$, extending downward, and in each is a slot, $e$, through which the studs $a$ pass to the frame, and, as seen in Fig. 3, these slots allow the cover to sit close down upon the dish, and also to be raised from the dish to the extent of the slots. They also prevent the entire removal of the cover from the studs.

To open the dish, raise the cover and turn it to either side, allowing it to fall down around and beneath the dish, as denoted in broken lines, Fig. 3, where it will be suspended by slotted arms $d$ upon the studs $a$, and from which position it may be easily returned to close the dish.

In order to prevent possible contact of the cover with the dish in turning, as well as to prevent the cover from being turned until after it has been raised to a certain height, a cam, $c$, is fixed upon the studs $a$, preferably of a circular form, and with a vertical slot, $b$, opening upward, as seen in Fig. 4, and from the arm or cover a stud, $f$, extends into these slots; hence the cover, to be turned, must be raised so far as to clear the slots $b$, and then, in turning over, the cams will prevent the cover from coming in contact with the dish, and will practically guide the cover both in opening and in closing.

By constructing the cams as seen in Fig. 5 the slotted arms may be dispensed with. The cam proper is the same, but it is surrounded by a ring, R, so as to leave a groove around the cam, which the studs $f$ will follow after being raised from the slots $b$, or to return to the said slots. The arms are, however, preferable, as tending to more perfectly guide the cover while being turned.

I claim—

1. The dish A, provided with studs $a$ upon opposite sides, and the cover B, provided with slotted vertical arms $d$, substantially as described, so as to be turned and suspended beneath the dish, substantially as set forth.

2. The combination of the stationary dish and slotted cams with the cover provided with studs extending into the slots of said cams, and guides, substantially such as described, to govern the movement of the cover as it is turned to and from the dish, substantially as specified.

W. E. HAWKINS.

Witnesses:
G. W. HULL,
C. G. POMEROY.